United States Patent
Ando et al.

(10) Patent No.: US 9,880,053 B2
(45) Date of Patent: Jan. 30, 2018

(54) IMAGE PICKUP APPARATUS, SPECTROSCOPIC SYSTEM, AND SPECTROSCOPIC METHOD

(71) Applicant: Panasonic Intellectual Property Management Co., Ltd., Osaka (JP)

(72) Inventors: Takamasa Ando, Osaka (JP); Tsuguhiro Korenaga, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 29 days.

(21) Appl. No.: 14/883,097

(22) Filed: Oct. 14, 2015

(65) Prior Publication Data

US 2016/0123810 A1 May 5, 2016

(30) Foreign Application Priority Data

Oct. 29, 2014 (JP) ................ 2014-219951

(51) Int. Cl.
*G01J 3/28* (2006.01)
*G01J 3/14* (2006.01)
(Continued)

(52) U.S. Cl.
CPC ............. *G01J 3/14* (2013.01); *G02B 3/0062* (2013.01); *G01J 3/0208* (2013.01); *G01J 2003/2813* (2013.01); *G01J 2003/2826* (2013.01)

(58) Field of Classification Search
CPC .... G01J 3/02; G01J 3/28; G01J 3/2803; G01J 3/10; G01J 3/2823
(Continued)

(56) References Cited

U.S. PATENT DOCUMENTS

2006/0038705 A1 2/2006 Brady et al.
2007/0241266 A1* 10/2007 Gweon ............. G02B 21/0032
250/225
(Continued)

FOREIGN PATENT DOCUMENTS

JP 2002-077660 3/2002
JP 2007-108124 4/2007
(Continued)

*Primary Examiner* — Tarifur Chowdhury
*Assistant Examiner* — Md M Rahman
(74) *Attorney, Agent, or Firm* — McDermott Will & Emery LLP

(57) ABSTRACT

An image pickup apparatus includes an encoder which is arranged on an optical path of light incident from an object and which has a plurality of regions with first light transmittance and a plurality of regions with second light transmittance lower than the first light transmittance, a dispersive element which is arranged on an optical path of at least one part of light after passage through the encoder and which spatially shifts the at least one part of the light in accordance with wavelength, and at least one image pickup device which is arranged to receive light after passage through the dispersive element and light without passage through the dispersive element and which acquires a first image, in which light components for respective wavelengths spatially shifted by the dispersive element are superimposed, and a second image based on the light without passage through the dispersive element.

11 Claims, 11 Drawing Sheets

(51) Int. Cl.
*G02B 3/00* (2006.01)
*G01J 3/02* (2006.01)

(58) Field of Classification Search
USPC .......................................................... 356/326
See application file for complete search history.

(56) References Cited

U.S. PATENT DOCUMENTS

| | | | |
|---|---|---|---|
| 2013/0194481 A1* | 8/2013 | Golub | H04N 9/045 348/336 |
| 2014/0098212 A1* | 4/2014 | Yamanaka | H04N 5/30 348/79 |
| 2014/0163391 A1 | 6/2014 | Koizumi et al. | |
| 2015/0029503 A1* | 1/2015 | McMackin | G01J 3/18 356/300 |
| 2015/0116705 A1* | 4/2015 | Harmsma | G01J 3/02 356/300 |

FOREIGN PATENT DOCUMENTS

| | | |
|---|---|---|
| JP | 2011-089895 | 5/2011 |
| JP | 2011-164022 | 8/2011 |
| WO | 2007/046280 | 4/2007 |
| WO | 2013/002350 | 1/2013 |

\* cited by examiner

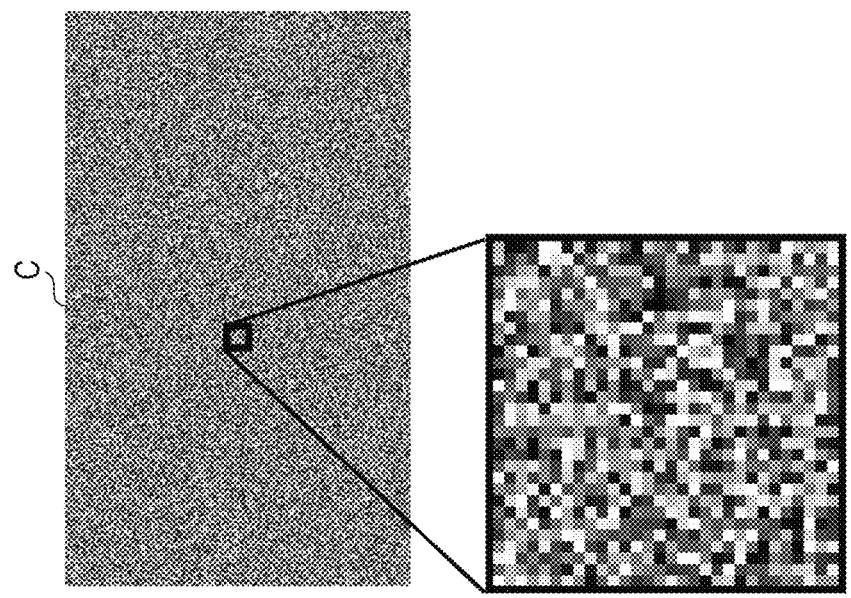
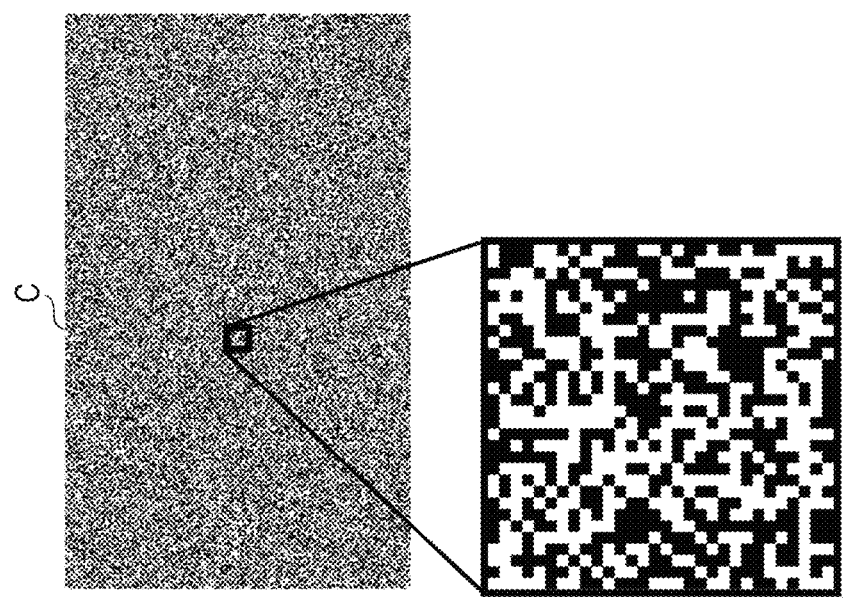

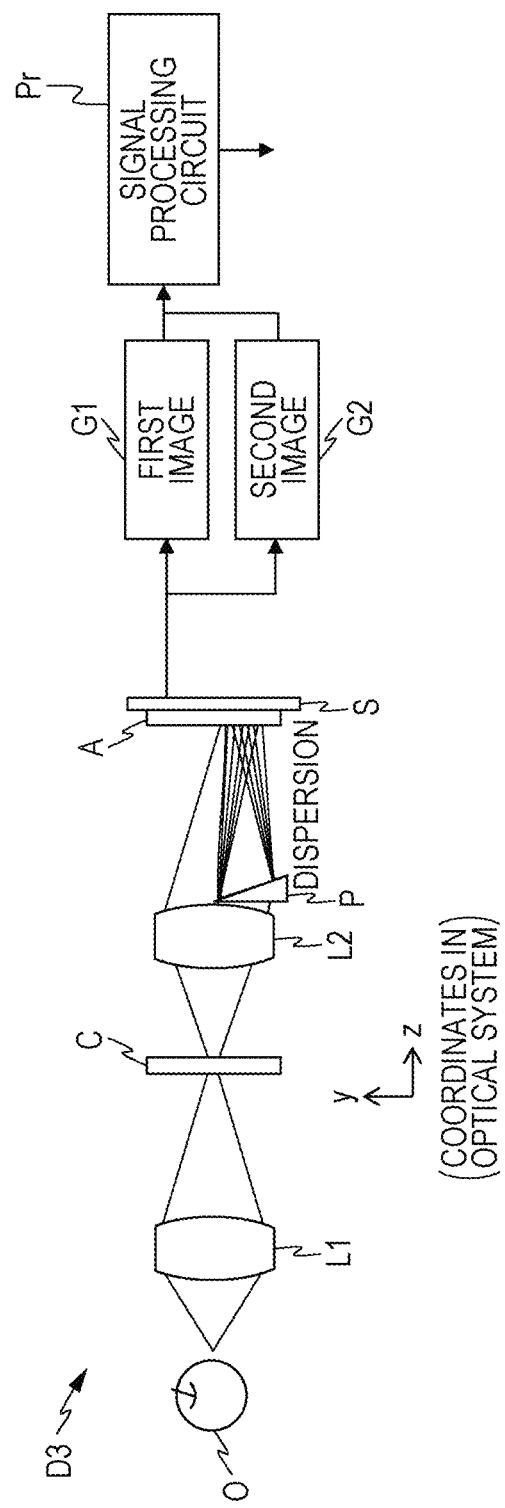

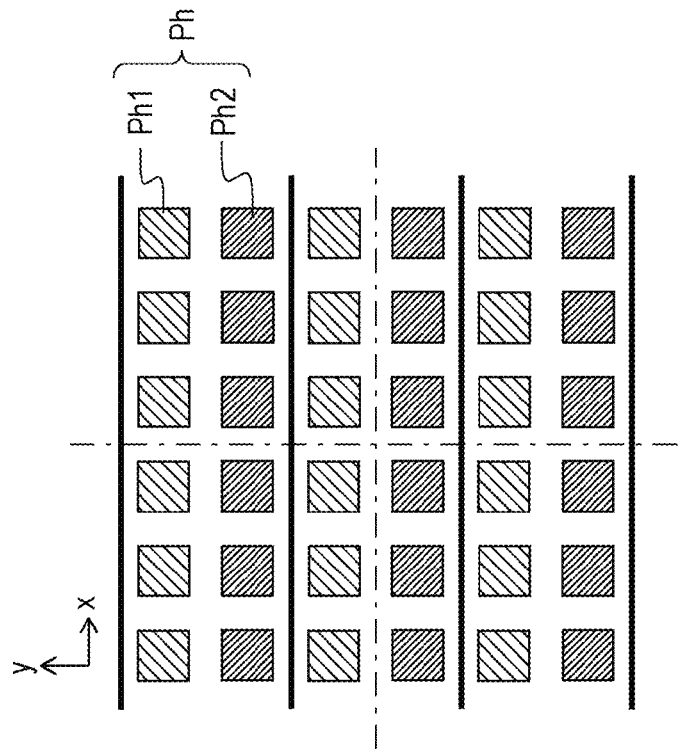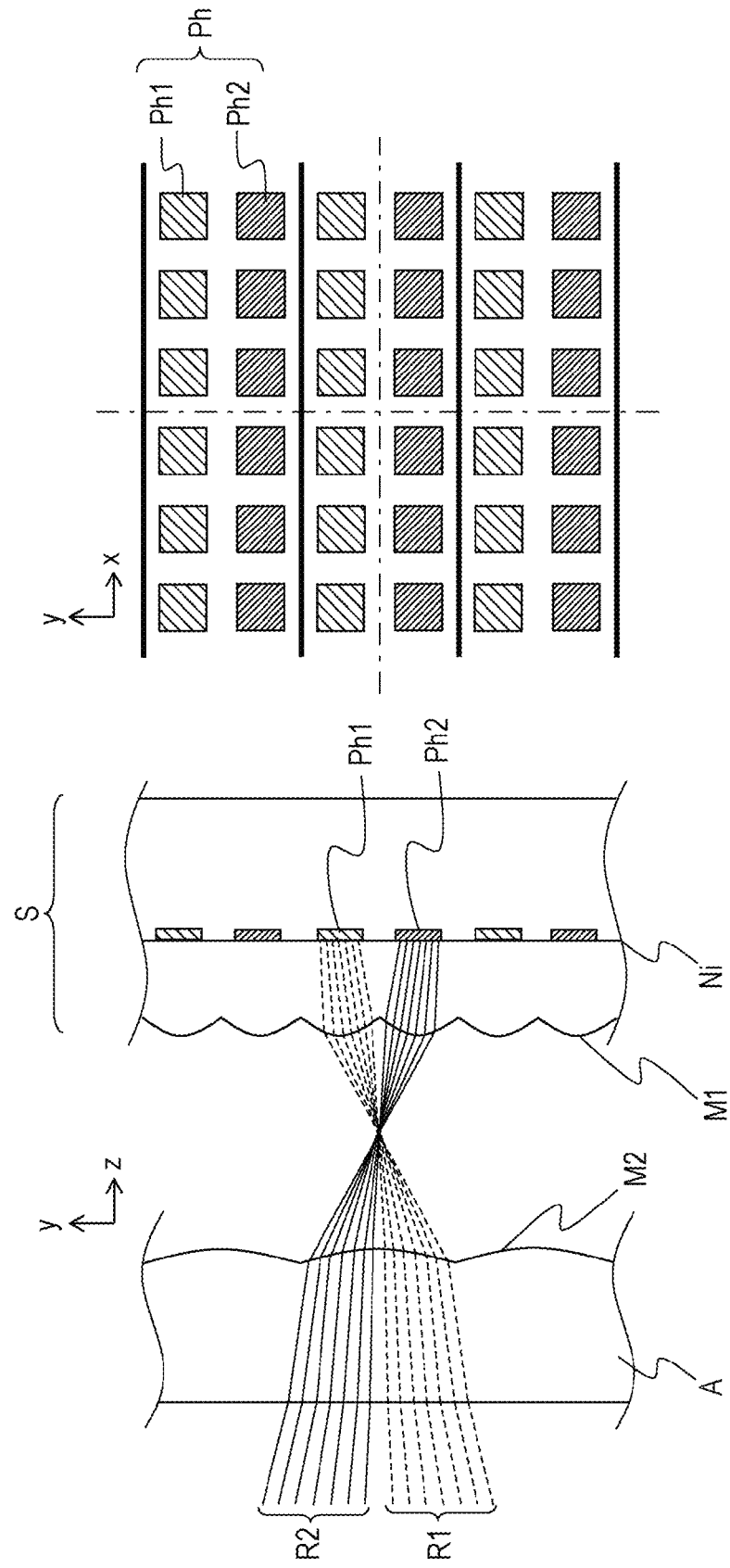

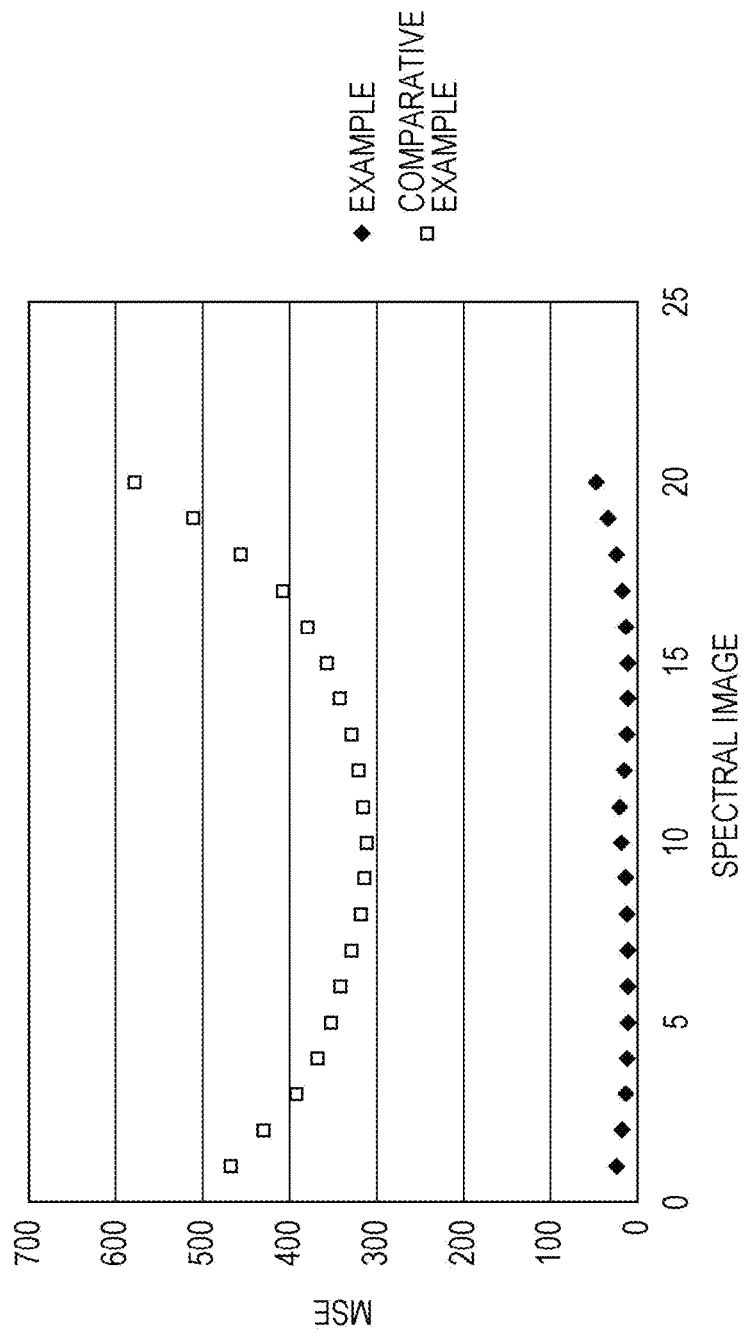

IMAGE PICKUP APPARATUS, SPECTROSCOPIC SYSTEM, AND SPECTROSCOPIC METHOD

BACKGROUND

1. Technical Field

The present disclosure relates to an image pickup apparatus for acquiring a spectral image, a spectroscopic system, and a spectroscopic method using the image pickup apparatus and/or the spectroscopic system.

2. Description of the Related Art

Utilization of spectral information for a large number (e.g., several tens or more) of narrow wavelength bands allows grasp of detailed physical properties of an observed object, which cannot be obtained from a conventional RGB image. A camera which acquires information for multiple wavelength bands is called a "hyperspectral camera". Hyperspectral cameras are used in all fields, such as food inspection, living body inspection, drug development, and mineral component analysis.

As an example of utilization of information for a limited narrow wavelength band, International Publication No. 13/002350 discloses a device which discriminates between a tumor site and a non-tumor site in a subject. The device detects, through irradiation with excitation light, fluorescence at 635 nm emitted from protoporphyrin IX which is accumulated in cancer cells and fluorescence at 675 nm emitted from photo-protoporphyrin, thereby distinguishing between a tumor site and a non-tumor site.

Japanese Unexamined Patent Application Publication No. 2007-108124 discloses a method for judging the freshness of perishable food that lowers over time by acquiring information on reflectance characteristics of light with continuous multiple wavelengths.

Hyperspectral cameras capable of acquiring images and/or measuring reflectance for multiple wavelengths are broadly divided into the four types:
(a) a line sensor type;
(b) an electronic filter type;
(c) a Fourier transform type; and
(d) an interference filter type.

In a hyperspectral camera of the line sensor type in (a), one-dimensional information on an object is acquired using a member having a linear slit. Light after passage through the slit is separated by a dispersive element, such as a diffraction grating or a prism, in accordance with wavelength. Separated light components of different wavelengths are detected by an image pickup device (e.g., image sensor) having a plurality of two-dimensionally arrayed pixels. Under this system, only one-dimensional information on an object to be measured is obtained at one time. Two-dimensional spectral information is scanned by operating the whole camera or the object to be measured perpendicularly to a direction of the slit. The line sensor type has the advantage that high-resolution images for multiple wavelengths are obtained. Japanese Unexamined Patent Application Publication No. 2011-89895 discloses an example of the hyperspectral camera of the line sensor type.

Hyperspectral cameras of the electronic filter type in (b) fall into a type using a liquid crystal tunable filter (LCTF) and a type using an acousto-optic tunable filter (AOTF). A liquid crystal tunable filter is an element with multiple tiers, each having a linear polarizer, a birefringent filter, and a liquid crystal cell. The liquid crystal tunable filter can eliminate light of an unnecessary wavelength and extract only light of any specific wavelength only through voltage control. An acousto-optic device is composed of an acousto-optic crystal and a piezoelectric element, which are bonded with each other. When an electrical signal is applied to the acousto-optic crystal, ultrasonic waves are generated, and thereby compressional standing waves are formed within the crystal. With a diffraction effect of the standing waves, the acousto-optic device can extract only light of any specific wavelength. Although a target wavelength is limited, the electronic filter type has the advantage of being able to acquire high-resolution moving image data.

A hyperspectral camera of the Fourier transform type in (c) uses the principle in a two-beam interferometer. A light beam from an object to be measured is split into light beams by a beam splitter, and the light beams are reflected by a fixed mirror and a movable mirror, respectively, and are coupled again. A coupled light beam is then observed by a detector. Data indicating a change in the intensity of interference dependent on a light wavelength can be acquired by varying the position of the movable mirror over time. A Fourier transform is performed on the obtained data to obtain spectral information. The Fourier transform type has the advantage of being able to simultaneously acquire pieces of information for multiple wavelengths.

A hyperspectral camera of the interference filter type in (d) is of a type using the principle in a Fabry-Perot interferometer. The interference filter type uses a configuration in which optical elements having two faces with high reflectance which are separate by a predetermined distance are arranged on a sensor. Distances between the two faces of the optical elements differ from region to region and are determined so as to meet an interference condition for light of a desired wavelength. The interference filter type has the advantage of being able to simultaneously acquire pieces of information for multiple wavelengths as a moving image.

Besides the types, there is available a type using compressive sensing, as disclosed in, for example, U.S. Pat. No. 7,283,231. A device disclosed in U.S. Pat. No. 7,283,231 disperses light from an object to be measured with a first dispersive element such as a prism, marks the dispersed light with a coded mask, and restores a light ray path with a second dispersive element. With this configuration, an image which is obtained through coding and multiplexing on a wavelength axis is acquired by a sensor. A plurality of images for multiple wavelengths can be reconstructed from the multiplexed image through use of compression sensing.

Compressing sensing refers to a technique for restoring, from a small number of pieces of data acquired as samples, pieces of data larger in number. Assuming that (x,y) is two-dimensional coordinates of an object to be measured and $\lambda$ is a wavelength, data f desired to be obtained is the three-dimensional data (x,y,$\lambda$). In contrast, image data g obtained by a sensor is two-dimensional data which is compressed and multiplexed in a $\lambda$ axis direction. The problem of obtaining the data f larger in data volume from the acquired image g smaller in data volume is a so-called ill-posed problem and is impossible to solve in this state. However, data of a natural image generally has redundancy, and skillful utilization of the redundancy allows conversion of the ill-posed problem into a well-posed problem. An example of a technique for reducing data volume using the redundancy of an image is JPEG compression. JPEG compression uses the process of converting image information into a frequency component and removing a non-essential portion of data (for example, a component with low visibility). In compressive sensing, the above-described technique is incorporated into arithmetic processing, and a desired data space is converted into a space represented with redundancy.

With this conversion, unknowns are reduced, and a solution is obtained. For the conversion, for example, a discrete cosine transform (DCT), a wavelet transform, a Fourier transform, or total variation (TV) is used.

SUMMARY

One non-limiting and exemplary embodiment provides a new image pickup technique capable of simultaneously satisfying the three requirements: high resolution, multiple wavelengths, and moving image photographing (e.g., one-shot photographing).

In one general aspect, the techniques disclosed here feature an image pickup apparatus including an encoder which is arranged on an optical path of light incident from an object and which has a plurality of regions with first light transmittance and a plurality of regions with second light transmittance lower than the first light transmittance, a dispersive element which is arranged on an optical path of at least one part of light after passage through the encoder and which spatially shifts the at least one part of the light in accordance with wavelength, and at least one image pickup device which is arranged to receive light after passage through the dispersive element and light without passage through the dispersive element, the at least one image pickup device acquiring a first image, in which light components for respective wavelengths spatially shifted by the dispersive element are superimposed, and a second image based on the light without the passage through the dispersive element.

It should be noted that comprehensive or specific embodiments may be implemented as an apparatus, a device, a system, a method, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2A is front view of an encoder according to the first embodiment of the present disclosure when viewed from a subject side, which has an encoding pattern having a binary transmission/reflection distribution;

FIG. 2B is front view of an encoder according to the first embodiment of the present disclosure when viewed from a subject side, which has an encoding pattern having a gray-scale transmittance distribution;

FIG. 5 is a schematic diagram showing an image pickup apparatus according to a third embodiment of the present disclosure;

FIG. 6A is a view showing the relation between an optical array element and an image pickup device according to the third embodiment of the present disclosure;

FIG. 6B is a view showing the positional relation between the optical array element and pixels on the image pickup device;

FIG. 11 is a chart showing mean squared errors (MSEs) between respective spectral images generated in Example and Comparative Example of the present disclosure and a correct answer image.

DETAILED DESCRIPTION

Figure 1:
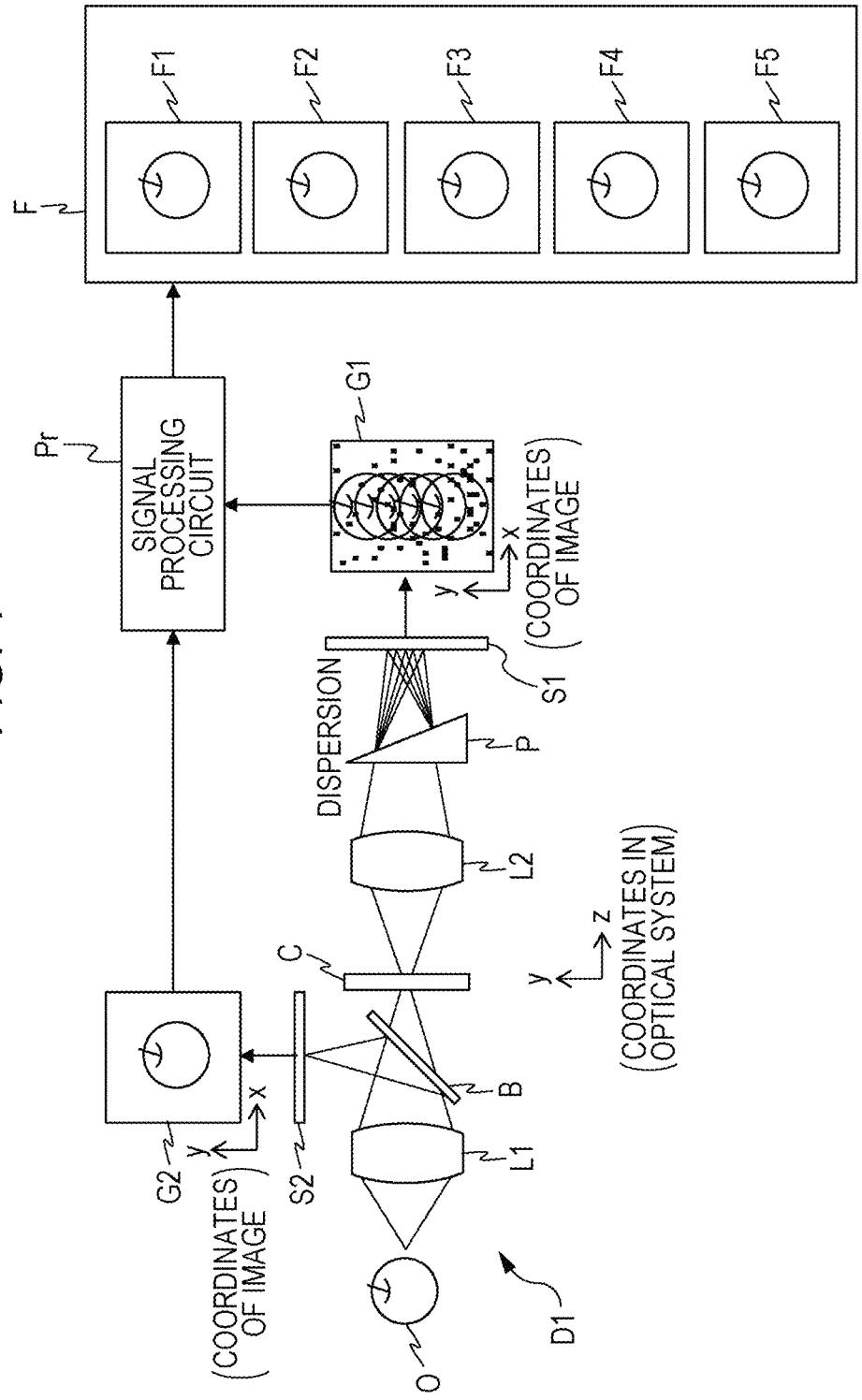
FIG. 1 is a schematic diagram of an image pickup apparatus according to a first embodiment of the present disclosure.

Underlying Knowledge Forming Basis of the Present Disclosure

Before describing embodiments of the present disclosure, findings made by the present inventors will be described.

Studies by the present inventors have revealed that the above-described conventional hyperspectral cameras suffer from the problems below. The hyperspectral camera of the line sensor type in (a) needs to be operated to obtain a two-dimensional image and therefore is unfit to photograph a moving image of an object to be measured. The hyperspectral camera of the Fourier transform type in (c) needs movement of a reflecting mirror and therefore is unfit for moving image photographing. The hyperspectral camera of the electronic filter type in (b) acquires an image for one wavelength at a time and therefore is incapable of simultaneously acquiring images for multiple wavelengths. The hyperspectral camera of the interference filter type in (d) has a tradeoff between a spatial resolution and the number of wavelength bands, and therefore images for multiple wavelengths cannot be acquired without scarifying the spatial resolution. As described above, there is no hyperspectral camera that can simultaneously satisfy the three requirements of high resolution, multiple wavelengths, and moving image photographing (e.g., one-shot photographing), among existing hyperspectral cameras.

A configuration using compressive sensing is seemingly capable of simultaneously achieving high resolution, multiple wavelengths, and moving image photographing. However, since an image is reconstructed from a small amount of data by inference, the spatial resolution of an image to be acquired is likely to be lower than that of an original image. In particular, the higher the compression ratio of acquired data, the more pronounced effect the compression ratio has on the spatial resolution.

The present inventors have found the above-described problems and then studied a configuration for solving the problems. The present inventors have found that a reduction in resolution can be curbed by performing computation using not only an image, in which light components of different wavelengths are superimposed using a dispersive element, but also an image acquired without dispersion, and thus completed the technique according to the present disclosure. According to embodiments of the present disclosure, images for multiple wavelengths with a resolution higher than that of images for multiple wavelengths obtained by a conventional method using compressive sensing can be acquired. This allows simultaneous satisfaction of the three requirements of high resolution, multiple wavelengths, and moving image photographing (e.g., one-shot photographing). In an embodiment of the present disclosure, a piece of information for a wavelength direction can be compressed while two-dimensional data, for an x direction and a y direction, is hold. This enables data volume to be reduced, thereby allowing long-time data to be acquired.

Overview of Embodiments

The present disclosure includes image pickup apparatuses, a system, and a method described in the items below.

[Item 1]

An image pickup apparatus including: an encoder which is arranged on an optical path of light incident from an object and which has a plurality of regions with first light transmittance and a plurality of regions with second light transmittance lower than the first light transmittance; a dispersive element which is arranged on an optical path of at least one part of light after passage through the encoder and which spatially shifts the at least one part of the light in accordance with wavelength; and at least one image pickup device which is arranged to receive light after passage through the dispersive element and light without passage through the dispersive element, the at least one image pickup device acquiring a first image, in which light components for respective wavelengths spatially shifted by the dispersive element are superimposed, and a second image based on the light without passage through the dispersive element.

[Item 2]

The image pickup apparatus according to Item 1, further including: a beam splitter which is arranged on the optical path of the light incident from the object and which transmits one part of the light and reflects another part of the light, in which the dispersive element is arranged on an optical path of one of the parts of the light obtained through separation by the beam splitter, and the at least one image pickup device includes a first image pickup device arranged to receive the light after passage through the dispersive element and a second image pickup device arranged on an optical path of the other of the parts of the light obtained through the separation by the beam splitter, the first image pickup device acquires the first image, and the second image pickup device acquires the second image.

[Item 3]

The image pickup apparatus according to Item 2, in which the encoder is arranged between the beam splitter and the dispersive element.

[Item 4]

The image pickup apparatus according to Item 3, further including: a first optical system which is arranged between the object and the beam splitter and which focuses the light from the object onto a face of the encoder; and a second optical system which is arranged between the encoder and the dispersive element and which focuses the light after passage through the encoder onto an image pickup face of the first image pickup device.

[Item 5]

The image pickup apparatus according to Item 2, in which the encoder is arranged between the object and the beam splitter, and the image pickup apparatus further includes an optical system which is arranged between the encoder and the beam splitter and which focuses the light after passage through the encoder onto an image pickup face of the first image pickup device and onto an image pickup face of the second image pickup device.

[Item 6]

The image pickup apparatus according to Item 1, in which the image pickup device has a plurality of first light detection cells for acquiring the first image and a plurality of second light detection cells for acquiring the second image, the dispersive element is arranged on an optical path of one part of the light after passage through the encoder, and the image pickup apparatus further includes an optical array element which is arranged to face an image pickup face of the image pickup device, the optical array element causing the light after passage through the dispersive element to enter the plurality of first light detection cells and causing the light without passage through the dispersive element to enter the plurality of second light detection cells.

[Item 7]

The image pickup apparatus according to any one of Items 1 to 6, further including a signal processing circuit which generates a plurality of images for respective wavelength bands of the light after passage through the dispersive element on a basis of the first image, the second image, and a spatial distribution of light transmittance in the encoder.

[Item 8]

The image pickup apparatus according to Item 7, in which the signal processing circuit generates the plurality of images for the respective wavelength bands by a statistical method.

[Item 9]

The image pickup apparatus according to Item 7 or 8, in which the number of pieces of data in the plurality of images for the respective wavelength bands of the light is larger than a sum of the number of pieces of data in the first image and the number of pieces of data in the second image.

[Item 10]

The image pickup apparatus according to any one of Items 7 to 9, in which the signal processing circuit generates, as the plurality of images for the respective wavelength bands, a vector f' calculated using a vector g having, as elements, signal values of a plurality of pixels in the first image and signal values of a plurality of pixels in the second image and a matrix H determined by the spatial distribution of light transmittance in the encoder and a spectral characteristic of the dispersive element, the vector f' being calculated by:

$$f' = \underset{f}{\operatorname{argmin}} \|g - Hf\|_{l_2} + \tau\Phi(f)$$

where $\tau\Phi(f)$ is a regularization term and $\tau$ is a weighting factor.

[Item 11]

A spectroscopic system including: an image pickup apparatus which includes an encoder which is arranged on an optical path of light incident from an object and which has a plurality of regions with first light transmittance and a plurality of regions with second light transmittance lower than the first light transmittance, a dispersive element which is arranged on an optical path of at least one part of light after passage through the encoder and which spatially shifts the at least one part of the light in accordance with wavelength, and at least one image pickup device which is arranged to receive light after passage through the dispersive element and light without passage through the dispersive element, the at least one image pickup device acquiring a first image, in which light components for respective wavelengths spatially shifted by the dispersive element are superimposed, and a second image based on the light without passage through the dispersive element; and a signal processing apparatus which generates a plurality of images for respective wavelength bands of light after passage through the dispersive element on a basis of the first image, the second image, and a spatial distribution of light transmittance in the encoder.

[Item 12]

A spectroscopic method including: spatially encoding intensity of light incident from an object; spatially shifting at least one part of the encoded light in accordance with wavelength; acquiring a first image, in which light components for respective wavelengths after the spatial shifting are superimposed, and a second image based on light without the spatial shifting in accordance with wavelength; and generating a plurality of images for respective wavelength bands on a basis of the first image, the second image, and a pattern for the encoding.

More specific embodiments of the present disclosure will be described below with reference to the drawings.

The embodiments described below are all comprehensive or specific examples. Numerical values, shapes, materials, constituent elements, arrangement positions and connection forms of the constituent elements, steps, the order of the steps, and the like illustrated in the embodiments below are merely illustrative, and are not intended to limit the present disclosure. Among the constituent elements in the embodiments below, those not described in an independent claim representing a top-level concept will be described as optional constituent elements.

In the description below, signals representing an image (i.e., a collection of signals indicating respective pixel values of pixels) may be simply referred to as an "image". x, y, and z coordinates shown in the drawings may be used in the description below.

First Embodiment

FIG. 1 is a schematic diagram showing an image pickup apparatus D1 according to a first embodiment. The image pickup apparatus D1 according to the present embodiment includes imaging optical systems L1 and L2, a beam splitter B, an encoder C, a dispersive element P, and image pickup devices S1 and S2. The image pickup device S1 acquires a first image G1 and the image pickup device S2 acquires a first image G2. A signal processing circuit Pr is also shown in FIG. 1. The signal processing circuit Pr processes image signals output from the image pickup devices S1 and S2. The signal processing circuit Pr may be incorporated in the image pickup apparatus D1 or may be provided outside the image pickup apparatus D1. In the latter case, a signal processing apparatus may include the signal processing circuit Pr and the image pickup apparatus D1, which are electrically connected to each other by wire or wirelessly. The signal processing circuit Pr estimates, based on the first image G1 and the second image G2, a plurality of images F for respective wavelength bands of light from an object O to be measured. The plurality of images F may also be referred to as "spectral images F" hereinafter.

The imaging optical systems L1 and L2 each include at least one image pickup lens. Although the imaging optical systems L1 and L2 are each shown as one lens in FIG. 1, the imaging optical systems L1 and L2 may each include a combination of a plurality of lenses. FIG. 1 shows optical axis directions of the imaging optical systems L1 and L2 as a z-axis.

The beam splitter B is arranged between the imaging optical system L1 and the imaging optical system L2. The beam splitter B splits an incident light beam into two directions regardless of wavelength. More specifically, the beam splitter B transmits a part of a light beam incident from an object in a direction of the image pickup device S1 and reflects another part in a direction of the image pickup device S2. Examples of the beam splitter B include a cubic beam splitter made of two prisms and a beam splitter plate such as a half mirror, for example.

The encoder C is arranged at an imaging plane of the imaging optical system L1. The encoder C is arranged between the beam splitter B and the dispersive element P. The encoder C is a mask which has a spatial distribution of light transmittance. The encoder C has at least a plurality of regions with first light transmittance and a plurality of regions with second light transmittance lower than the first light transmittance. The encoder C lets light incident through the beam splitter B pass through while spatially modulates the intensity of the light.

FIGS. 2A and 2B are views showing examples of a two-dimensional distribution of light transmittance of the encoder C. FIG. 2A shows a light transmittance distribution of the encoder C according to the present embodiment. In FIG. 2A, a black portion represents a region which hardly transmits light (referred to as a "light-blocking region") while a white portion represents a region which transmits light (referred to as a "translucent region"). In this example, the light transmittance of the white portion is almost 100%, and the light transmittance of the black portion is almost 0%. The encoder C is divided into a plurality of rectangular regions, each of which is a translucent region or a light-blocking region. Thus, in the example shown in FIG. 2A, the encoder C has a plurality of rectangular regions with the first light transmittance of 100% and a plurality of rectangular regions with the second light transmittance of almost 0%. A two-dimensional distribution of translucent regions and light-blocking regions in the encoder C can be, for example, a random distribution or a quasi-random distribution.

A random distribution and a quasi-random distribution are considered as follows. Each rectangular region in the encoder C can be regarded as, for example, a vector element which has a value of 1 or 0 corresponding to light transmittance. In other words, a collection of rectangular regions arranged in a column can be regarded as a multi-dimensional vector having values of 1 or 0. Thus, the encoder C includes a plurality of multi-dimensional vectors in a row direction. In this case, a random distribution means that any two multi-dimensional vectors are independent of (i.e., not parallel to) each other. A quasi-random distribution means that some multi-dimensional vectors include ones which are not independent.

A random distribution and a quasi-random distribution can also be defined using an autocorrelation function defined by the Formula (1):

$$y(i, j) = \sum_{m=1}^{M} \sum_{n=1}^{N} x(m, n) \cdot x(m + i, n + j) \qquad (1)$$

In Formula (1), x(m,n) represents the light transmittance of a rectangular region which is the m-th in a longitudinal direction and the n-th in a lateral direction in the encoder C composed of an array of M wide by N high rectangular regions, that is, a total of M×N rectangular regions. Additionally, i=−(M−1), . . . , −1, 0, 1, . . . , (M−1), and j=−(N−1), . . . , −1, 0, 1, . . . , (N−1). Note that if m<1, n<1, m>M, or n>N, x(m,n)=0 is obtained. In this case, a random distribution means that the autocorrelation function y(i,j) defined by Formula (1) has a maximum value if i=0 and j=0 and does not have a maximum value otherwise (if i≠0 and/or j≠0). More specifically, a random distribution means that the autocorrelation function y(i,j) decreases monotonically from i=0 toward i=M−1 and i=−(M−1) and decreases monotonically from j=0 toward j=N−1 and j=−(N−1). A quasi-random distribution means that the autocorrelation function y(i,j) has a maximum value at M/10 or less points in an i direction and a maximum value at N/10 or less points in a j direction, besides a point for y(0,0).

The light passing through the encoder C is dispersed by the dispersive element P to form an optical image, in which light components of different wavelengths are imaged in mutually shifted positions. Therefore encoding by the encoder C plays the role of marking for distinguishing among the light components of different wavelengths in the image. The distribution of transmittance may be arbitrarily set as long as the above-described marking is possible. Although the ratio between the number of black portions and that of white portions is 1:1 in the example shown in FIG. 2A, the present disclosure is not limited to this. For example, the distribution may be deflected to one side, like a case where the ratio between the number of white portions and that of black portions is 1:9. As shown in FIG. 2B, the mask may be a mask having a gray-scale distribution of transmittance. In this case, the encoder C has a plurality of rectangular regions with third light transmittance different from the first and second light transmittance, for example. Information on the transmittance distribution of the encoder C may be acquired in advance from design data or by actual measurement calibration.

The dispersive element P is an element which disperses an incident light beam in accordance with wavelength. The dispersive element P can be composed of, for example, a prism or a diffractive optical element. Light encoded by the encoder C passes through the imaging optical system L2 and then enters the dispersive element P. The light dispersed by the dispersive element P forms the optical image, which contains light components of different wavelengths, on an image pickup face of the image pickup device S1. In FIG. 1, the dispersive element P causes imaging positions of wavelength components included in the optical image to be mutually shifted in a y direction (i.e., a longitudinal direction of the optical image) in accordance with wavelength. If the dispersive element P is a prism, the shift amount is determined by the refractive index of the dispersive element P, an Abbe number of the dispersive element P, a surface tilt angle of the dispersive element P, and the distance between the dispersive element P and the image pickup device S1. If the dispersive element P is a diffractive optical element, the shift amount is determined by the refractive index of the dispersive element P, the Abbe number of the dispersive element P, the distance between the dispersive element P and the image pickup device S1, and a diffractive grating pitch. Here, the term "shift amount" means a degree of relative positional shift among wavelength components in an optical image. The term "shift direction" means a direction of relative positional shift among wavelength components in an optical image. The dispersive element P may cause imaging positions of wavelength components in the optical image to be mutually shifted in an x direction (i.e., a lateral direction of the optical image) or in another direction. Alternatively, the shift amount or the shift direction may be changed in accordance with the object O to be measured. In the case of, for example, the object O to be measured that has a high-frequency texture (for example, lateral stripes) in the y direction, the dispersive element P may be configured such that the shift amount in the y direction is larger or the shift direction is not the y direction but the x direction.

The shift amounts for wavelengths take not discrete values for each wavelength band but continuous values according to wavelength. The shift amount may be calculated in advance by computation from design specifications or by actual measurement calibration. Note that the spectral images F are reconstructed for respective wavelength bands of predetermined width by the signal processing circuit Pr (to be described later). To be exact, wavelength components of the optical image are, even if belonging to a wavelength band of a spectral image F, imaged on the image pickup device S1 in mutually shifted positions. To improve the accuracy of reconstruction of the spectral images F, it is desirable to correct the positional shift among the light components which belong to a common wavelength band. The correction of the shift may be performed by computer arithmetic, or desirably by actual measurement calibration in view of effects of an optical system aberration and/or a mounting error. For example, calibration can be performed by installing a white plate as a subject at the position of the object O to be measured and forming an image of the encoder C on the image pickup device S1 through a band-pass filter for a desired wavelength band. Pieces of data for all desired wavelength bands may be acquired by using different band-pass filters for respective wavelength bands. Alternately, measurement may be performed for some selected bands, and pieces of data for the other bands between measured pieces of data may be interpolated. This method allows calculation of the shift amounts for wavelengths and also allows acquisition of pieces of transmittance information of the encoder C for the respective wavelength bands. Elements of a matrix H in Formulas (2) (to be described later) are determined on the basis of pieces of data calculated by calibration, for example.

The image pickup devices S1 and S2 are each a monochrome image pickup device having a plurality of two-dimensionally arrayed light detection cells (referred to as "pixels" in the present specification). The image pickup devices S1 and S2 can be, for example, charge-coupled device (CCD) or complementary metal oxide semiconductor (CMOS) sensors. Each light detection cell can be composed of, for example, a photodiode. The image pickup devices S1 and S2 may not be monochrome image pickup devices. For example, the image pickup devices S1 and S2 may be color image pickup devices having R, G, and B filters, R, G, B, and IR filters, or R, G, B, and W filters. The use of a color image pickup device allows an increase in the amount of wavelength-related information and thereby improvement in the accuracy of reconstruction of the spectral images F. Note that, if a color image pickup device is used, the amount of information in spatial directions (e.g., the x and y directions) decreases, because there is a trade-off between the amount of wavelength-related information and resolution. A measuring wavelength range of the image pickup devices S1 and S2 may be arbitrarily set. The wavelength range is not limited to a visible wavelength range and may be an ultraviolet, near-infrared, mid-infrared, or far-infrared wavelength range.

The signal processing circuit Pr is a circuit which processes image signals input from the image pickup devices S1 and S2. The signal processing circuit Pr can be implemented by, for example, a programmable logic device (PLD), such as a digital signal processor (DSP) or a field-programmable gate array (FPGA), or a combination of a central processing unit (CPU) and an image processing arithmetic processor (GPU) and a computer program. Such a computer program is stored in a recording medium, such as a memory, and arithmetic processing (to be described later) can be executed by a CPU executing the program. As described earlier, the signal processing circuit Pr may be provided outside the image pickup apparatus D1. In this configuration, the signal processing circuit Pr is contained in a signal processing apparatus, such as a personal computer (PC) electrically connected to the image pickup apparatus D1 or a cloud server on the Internet. In the present specification, a system including the above-described signal processing apparatus and an image pickup apparatus will be referred to as a "spectroscopic system".

The operation of the image pickup apparatus D1 according to the present embodiment will be described below.

Figure 3:
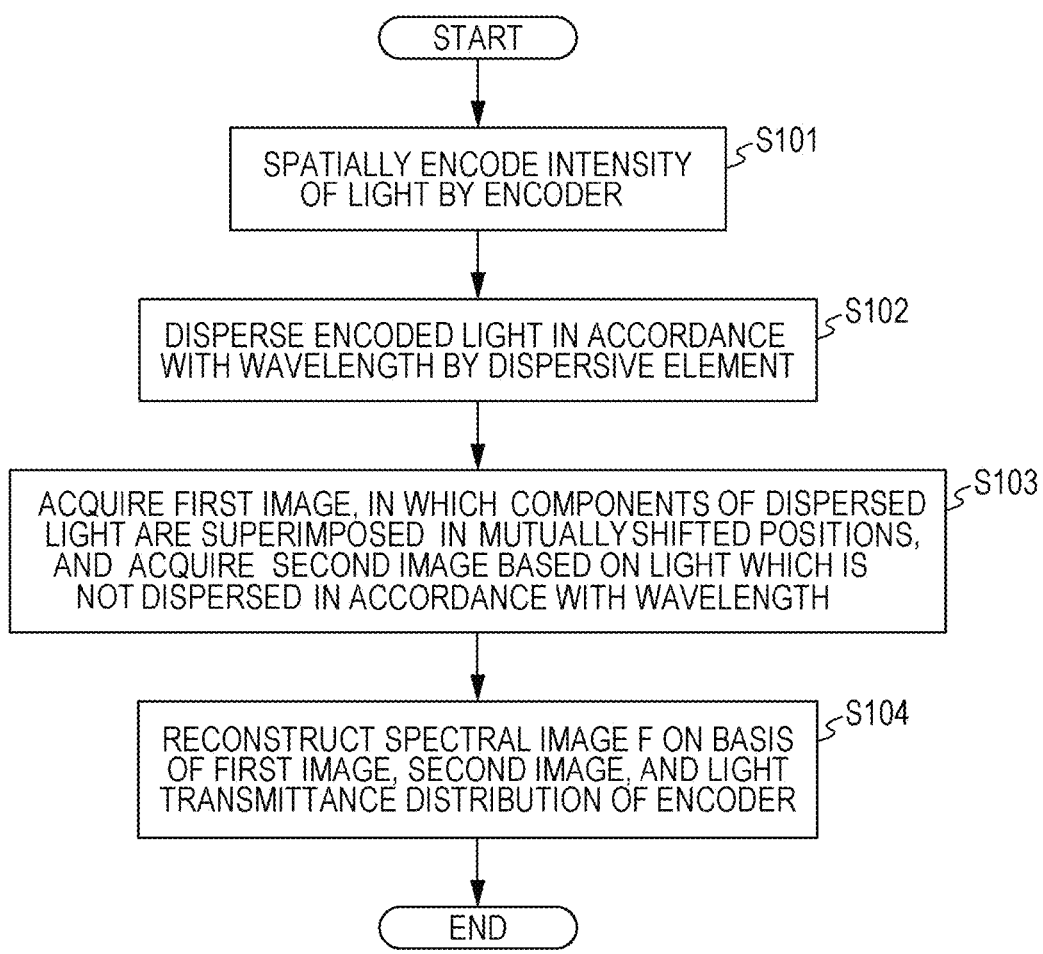
FIG. 3 is a flowchart showing the overview of a spectroscopic method according to the first embodiment of the present disclosure.

FIG. 3 is a flowchart showing the overview of a spectroscopic method according to the present embodiment. In step S101, light from the object O to be measured is encoded using the encoder C. The encoding is implemented through spatial modulation of the intensity of the light with the spatial distribution of light transmittance of the encoder C. In step S102, the encoded light is dispersed in accordance with wavelength by the dispersive element P and the dispersed light is imaged on the image pickup face. In step S103, a first image G1, in which components of the dispersed light are superimposed in mutually shifted positions, is acquired by the image pickup device S1. A second image G2, based on light which is not spatially dispersed by the dispersive element P in accordance with wavelength, is acquired by the image pickup device S2. In step S104, the spectral images F are reconstructed on the basis of the first image G1, the second image G2, and the light transmittance distribution of the encoder C.

A process of acquiring the first image G1 and the second image G2 by the image pickup apparatus D1 according to the present embodiment will be described.

A process of acquiring the first image G1 will be described first. A light beam from the object O is focused on the encoder C by the imaging optical system L1. An image of the light beam is encoded by the encoder C. In other words, the intensity of the light passing through the encoder C is modulated in accordance with the spatial distribution of transmittance of the encoder C. The encoded light beam is focused again by the imaging optical system L2 to form an optical image on the image pickup face of the image pickup device S1. At that time, the light beam is, before reaching the image pickup face, dispersed by the dispersive element P in accordance with wavelength. Thus, the light beam forms the multiple image, components of which overlap with one another in mutually shifted positions in accordance with wavelength, on the image pickup face of the image pickup device S1. The image pickup device S1 acquires the first image G1 by converting information of the multiple image into a plurality of electrical signals (i.e., pixel signals) with the plurality of light detection cells thereof. In FIG. 1, shift amounts in the y direction in the first image G1 are shown to be larger than actual sizes for the sake of clarity. A shift amount between images for two adjacent wavelength bands can practically be, for example, as fine as one pixel to about several tens of pixels. In FIG. 1, the first image G1 includes a plurality of black dots, which schematically represent low-brightness portions generated by the encoding. Note that the number and the layout of black dots shown in FIG. 1 do not reflect an actual number and an actual layout. In practice, low-brightness portions larger in number than the black dots shown in FIG. 1 may appear.

A process of acquiring the second image G2 will be described. The light beam from the object O to be measured is split by the beam splitter B after passing through the imaging optical system L1. The split light beam forms an optical image on an image pickup face of the image pickup device S2. This optical image is based on a light beam without passage through the dispersive element P, that is, without spatially dispersed by the dispersive element P. The image pickup device S2 acquires the second image G2 by converting information of the optical image into a plurality of pixel signals with the plurality of light detection cells thereof. The second image G2 is a monochrome image having information for all wavelength bands of the object to be measured. The second image G2 is acquired almost at the same time as acquisition of the first image G1.

In the example shown in FIG. 1, the first image G1 is formed from a light beam transmitted through the beam splitter B, and the second image G2 is formed from a light beam reflected by the beam splitter B. However, light beams transmitted and reflected by the beam splitter B and the first and second images G1 and G2 may be arbitrarily combined. The first image G1 may be formed from a light beam reflected by the beam splitter B, and the second image G2 may be formed from a transmitted light beam.

The image pickup apparatus D1 may further include a band-pass filter which transmits only components with some wavelength bands of an incident light beam. With this configuration, a measurement wavelength band can be limited. The limitation of the measurement wavelength band allows acquisition of the spectral images F for a limited desired wavelength with high separation accuracy.

A method for reconstructing the spectral images F for multiple wavelengths from the first image G1 and the second image G2 will be described. The term multiple wavelengths refers to, for example, wavelength bands larger in number than wavelength bands for three colors (R, G, B) acquired by a general color camera. The number of wavelength bands (that may be referred to as the "number of spectral bands") can be, for example, a number of four to about 100. The number of spectral bands may exceed 100 depending on the intended use.

Assuming that f is data of the spectral images F, and w is the number of spectral bands, the data f is data into which pieces $f_1, f_2, \ldots, f_w$ of image data for respective bands are integrated. Assuming that n is the number of pixels in an x direction of each piece of image data, and m is the number of pixels in a y direction, the pieces $f_1, f_2, \ldots, f_w$ of image data are a collection of pieces of two-dimensional data with n×m pixels. Thus, the data f is a piece of three-dimensional data with n×m×w elements. If components in a multiple image are shifted in the y direction per one pixel for each spectral band, the number of elements of data $g_1$ of the first image G1 to be acquired is n×(m+w−1). In contrast, the number of elements of data $g_2$ of the second image G2 is n×m. The data $g_1$ and the data $g_2$ in the present embodiment can be represented by Formulas (2) below:

$$g_1 = H_1 \begin{bmatrix} f_1 \\ f_2 \\ \vdots \\ f_w \end{bmatrix} \quad g_2 = H_2 \begin{bmatrix} f_1 \\ f_2 \\ \vdots \\ f_w \end{bmatrix} \quad (2)$$

Since the pieces $f_1, f_2, \ldots, f_w$ of data are each a piece of data with n×m elements, each vector on the right side is technically a one-dimensional vector with n×m×w rows and one column. Matrices $H_1$ and $H_2$ are system matrices indicating a conversion process from the data f into the data $g_1$ and a conversion process from the data f into the data $g_2$, respectively. The matrix $H_1$ indicates a conversion that encodes the data f, that is, performs intensity modulation for each pixel, shifts the pixel values of the components $f_1$, $f_2, \ldots, f_w$ in the y direction such that the pixel value of each component is shifted by one pixel with respect to the pixel value of a previous one, and adds up the pixel values. The matrix $H_2$ is a conversion that adds up the pixel values of the components $f_1, f_2, \ldots, f_w$ of the data f if a transmission/reflection split ratio at the beam splitter B is 1:1. Assuming that H is a system matrix into which the matrices $H_1$ and $H_2$ are integrated, and g is data into which the data $g_1$ and the data $g_2$ are integrated, the data g is represented by Formula (3) below:

$$g = Hf \quad (3)$$

Technically, the data f is expressed as a one-dimensional vector with n×m×w rows and one column, and the data g is expressed as a one-dimensional vector with n×(2m+w−1) rows and one column. Thus, the matrix H is a matrix with n×(2m+w−1) rows and n×m×w columns.

Since it is assumed in the present embodiment that images for respective wavelength bands are shifted in increments of one pixel, the number of elements of the data $g_1$ is n×(m+w−1). However, the images may not be shifted in increments of one pixel. A pixel increment for shifting may be two or more pixels. The pixel increment for shifting depends on how spectral bands and the number of spectral bands for the spectral images F to be reconstructed are designed. The number of elements of the data $g_1$ changes in accordance with the pixel increment for shifting. The shift direction is not limited to the y direction and may be the x direction. In a generalized case, if an image is shifted in increments of ky pixels in the y direction and in increments of kx pixels in the x direction, where ky and kx are arbitrary natural numbers, the number of elements of the data $g_1$ is {n+kx·(w−1)}×{m+ky·(w−1)}.

The transmission/reflection split ratio at the beam splitter B may not be 1:1 and may be any other value. If the split ratio is not 1:1, a coefficient for the matrix $H_1$ or the matrix $H_2$ of the system Formulas (2) may be corrected in accordance with the split ratio.

If the vector g and the matrix H are given, it seems that the data f can be calculated by solving an inverse problem of Formula (3). However, since the number of elements of n×m×w of the desired data f is larger than the number of elements of n×(2m+w−1) of the acquired data g, the problem is an ill-posed problem and cannot be directly solved. For this reason, the signal processing circuit Pr according to the present embodiment uses image redundancy included in the data f and finds a solution using compressive sensing. More specifically, the desired data f is estimated by solving Formula (4) below:

$$f' = \mathrm{argmin}_{f}\{\|g - Hf\|_{l_2} + \tau\Phi(f)\} \quad (4)$$

Reference character f' represents estimated data of the data f. The first term in the braces in Formula (4) represents the amount of deviation of an estimation result Hf from the acquired data g, that is, a so-called residual term. The residual term can be expressed as the sum of squares, an absolute value, or the square root of sum of squares. The second term in the braces is a regularization term, or a stabilization term, (to be described later). Formula (4) means obtaining the data f that minimizes the sum of the first and second terms. The signal processing circuit Pr can converge on a solution by recursive and iterative operations and thereby calculate the final solution f'.

The first term in the braces in Formula (4) means an operation of calculating the sum of squares of the difference between the acquired data g and the estimation result Hf that is a result of subjecting the data f to system conversion with the matrix H in the estimation process. $\Phi(f)$ in the second term denotes a constraint condition in regularization of the data f and a function reflecting sparse information of estimated data. The function $\Phi(f)$ has the effect of smoothing or stabilizing estimated data. The regularization term can be expressed as, for example, the discrete cosine transform (DCT), the wavelet transform, the Fourier transform, or the total variation (TV) of the data f. For example, if total variation is used as the regularization term, stable estimated data with reduced effect of noise in the observed data g can be acquired. The sparseness of the object O to be measured in a space of each regularization term depends on the texture of the object O to be measured. A regularization term may be selected such that the texture of the object O to be measured is more sparse in a space of the regularization term. Alternatively, the operation may include a plurality of regularization terms. τ denotes a weighting factor. The larger a value of the weighting factor, the larger the amount of redundant data cut (i.e., the higher a compression ratio). The smaller the value of the weighting factor, the weaker convergence on a solution. The weighting factor τ is set to an appropriate value at which the data f converges to some degree, and excessive compression is inhibited.

Note that although an operation example using compressive sensing indicated by Formula (4) has been illustrated here, a solution may be found using any other method. For example, a different statistical method, such as maximum likelihood estimation or Bayes estimation, can be used instead. The number of spectral images F may be any number, and wavelength bands may be arbitrarily set.

As described above, in the present embodiment, the image data f is obtained using not only an image including a plurality of wavelength components which are imaged in mutually shifted positions by the dispersive element P but also an image based on a light beam without passage through the dispersive element P. As will be described in Example (to be described later), this configuration allows a reduction in deterioration of resolution due to compressive sensing. Thus, the three requirements of high resolution, multiple wavelengths, and moving image photographing (e.g., one-shot photographing) can be simultaneously satisfied. Since it suffices to hold two-dimensional data at the time of image pickup, the present embodiment is effective in long-time data acquisition. Note that an image pickup device and a signal processing circuit according to the present embodiment may be configured to acquire only a still image.

Second Embodiment

A second embodiment is different from the first embodiment in that a spectral image is reconstructed using a blurred state of an encoding pattern in an image on an image face. A detailed description of the same matters as those in the first embodiment will be omitted below.

Figure 4:
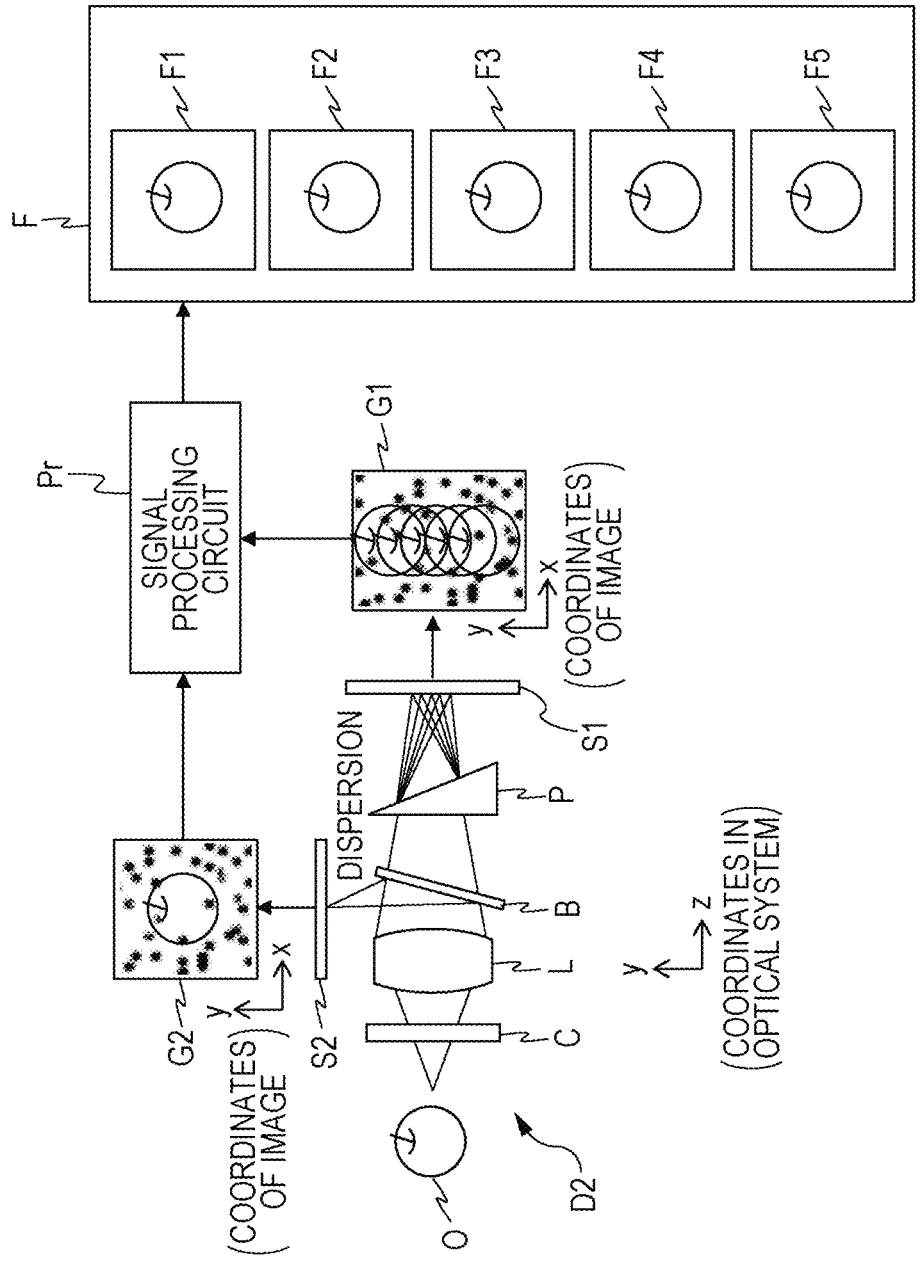
FIG. 4 is a schematic diagram showing an image pickup apparatus according to a second embodiment of the present disclosure.

FIG. 4 is a schematic diagram showing an image pickup apparatus D2 according to the present embodiment. In the image pickup apparatus D2, an encoder C is arranged between an object O to be measured and an imaging optical system L, unlike the image pickup apparatus D1. The imaging optical system L focuses a light beam after passage through the encoder C onto image pickup faces of image pickup devices S1 and S2. Since the encoder C may not be arranged at an imaging plane of an imaging optical system in the present embodiment, an optical system (e.g., relay optical system) other than the imaging optical system L is unnecessary. This allows a reduction in the overall size of an optical system.

The image pickup devices S1 and S2 acquire an encoding pattern of the encoder C in a blurred state. Thus, blur information is held in advance and is reflected in the system matrix H in Formula (3). The blur information is represented by a point spread function (PSF) here. The PSF is a function defining the degree of spread of a point image to surrounding pixels. For example, if a point image corresponding to one pixel on an image spreads across a region with k×k pixels around the pixel due to blurring, the PSF can be defined as a group of coefficients (i.e., a matrix) which indicates effects on the brightness of the pixels within the region. Spectral images F can be reconstructed by reflecting effects of the PSF on the encoding pattern of the encoder C in the system matrix H.

The encoder C may be arranged at any position, as far as not causing the encoding pattern of the encoder C to be severely blurred to disappear. For example, the encoder C may be arranged in the vicinity of a lens closest to the object O to be measured in the imaging optical system L or in the vicinity of the object O to be measured, and may be arranged away from a diaphragm. With this configuration, when the optical system L has a wide angle of view and a short focal length, there is little overlap between light beams with respective angles of view, and therefore the encoding pattern is likely to remain on the image pickup device S1 with little blur. Alternately, the encoder C may be arranged closer to the image pickup device S1. With this configuration, the encoding pattern is also likely to remain. Note that, in this case as well, the encoder C needs to be arranged closer to the side of the object O to be measured than a dispersive element P.

Third Embodiment

A third embodiment is different from the first embodiment in that a first image G1 and a second image G2 are acquired using a configuration called pupil division. In the present embodiment, a detailed description of the same matters as those in the first embodiment will be omitted.

FIG. 5 is a schematic diagram showing an image pickup apparatus D3 according to the present embodiment. The image pickup apparatus D3 has one image pickup device S and does not have a beam splitter B. In the present embodiment, the dispersive element P is arranged on an optical path of a part of a light beam after passage through an encoder C. For example, a dispersive element P is arranged at an area of a diaphragm face of an imaging optical system L2. An optical array element A is arranged directly on an image pickup face of the image pickup device S. a dispersive element P is arranged at a portion of a diaphragm face of an imaging optical system L2.

FIG. 6A is a cross-sectional view showing the detailed configuration of the optical array element A. The optical array element A can be composed of, for example, a lenticular lens. The optical array element A according to the present embodiment has a structure in which a plurality of optical components M2 extending in an x direction are arrayed in a y direction. The plurality of optical components M2 may be a plurality of cylindrical lenses, for example. The present disclosure, however, is not limited to this configuration. For example, the optical array element A may have a configuration in which a plurality of optical components M2 extending in the y direction are arrayed in the x direction.

The optical array element A is arranged in the vicinity of an imaging face of the imaging optical system L2. As shown in FIG. 6A, the optical array element A is spaced from an image pickup face Ni.

FIG. 6B is a plan view schematically showing some of a plurality of light detection cells (e.g., pixels) Ph which are two-dimensionally arrayed on the image pickup face of the image pickup device S. The plurality of light detection cells are classified into a plurality of first light detection cells (e.g., first pixels) Ph1 and a plurality of second light detection cells (e.g., second pixels) Ph2. The first pixel Ph1 is a pixel for acquiring a first image based on light after passage through the dispersive element P. The second pixel Ph2 is a pixel for acquiring a second image based on light without passage through the dispersive element P.

Only one of light beams R1 and R2 after passage through two optical regions of the diaphragm face of the imaging optical system L2 passes through the dispersive element P. In other word, the diaphragm face of the imaging optical system L2 has an area where the dispersive element P is located and an area where no dispersive element is located. For example, only the light beam R1 passes through the dispersive element P. After that, the light beams R1 and R2 enter the optical array element A. The optical array element A causes the light beam R1 after passage through the dispersive element P to enter a plurality of first pixels Ph1 in the image pickup device S and causes the light beam R2 without passage through the dispersive element P to enter a plurality of second pixels Ph2 in the image pickup device S.

FIG. 6B shows the positional relation between the optical array element A and pixels on the image pickup device S. Each bold line indicates the border between each adjacent two of the plurality of optical components M2 in the optical array element A. The optical array element A is arranged such that a surface having the plurality of optical components M2 formed thereon faces toward the image pickup face Ni. The pixels Ph are arranged in a matrix at the image pickup face Ni.

The pixels Ph1 are arranged in a row in a lateral direction (i.e., row direction). The pixel Ph1 is arranged in every other row in a longitudinal direction (i.e., column direction). The pixels Ph2 are arranged in a row in the lateral direction. The pixel Ph2 is arranged in every other row in the longitudinal direction. Rows with the pixels Ph1 and rows with the pixels Ph2 are alternately arranged in the longitudinal direction.

If the optical array element A has a structure in which the plurality of optical components M2, each extending in the x direction, are arrayed in the y direction, the pixels Ph1 and the pixels Ph2 are arranged side by side in the x direction and alternately in the y direction. In this case, in the diaphragm face of the imaging optical system L2, the optical region where the dispersive element P is arranged and the optical region without a dispersive element are arranged in the y direction. If the optical array element A has a configuration in which the plurality of optical components M2, each extending in the y direction, are arrayed in the x direction, the pixels Ph1 and the pixels Ph2 are arranged side by side in the y direction and alternately in the x direction. In this case, in the diaphragm face of the imaging optical system L2, the optical face region where the dispersive element P is arranged and the optical face region without a dispersive element are arranged in the x direction. Each of the pixel Ph1 and the pixel Ph2 may not be arranged in every other row in the longitudinal direction and may be arranged in every n-th (n≥1) row.

The optical array element A is arranged such that one of the optical components M2 corresponds to pixels in 2n rows, which are composed of an n-th row of pixels Ph1 and an n-th row of pixels Ph2, on the image pickup face Ni. On the image pickup face Ni, microlenses M1 are provided so as to cover the faces of the pixels Ph1 and Ph2.

The above-described configuration allows the light beam R1 after passage through the dispersive element P to enter a plurality of first pixels Ph1 and allows the light beam R2 without passage through the dispersive element P to enter a plurality of second pixels Ph2. A signal processing circuit Pr acquires, from the image pickup device S, a first image G1 which is composed of signals output from the plurality of first pixels Ph1 and a second image G2 which is composed of signals output from the plurality of second pixels Ph2. Spectral images F can be estimated on the basis of the first image G1 and the second image G2 in the same manner as in the first embodiment.

In the present embodiment, the dispersive element P is provided in the vicinity of one of halves, into which the imaging optical system L2 is divided, and two images are acquired. That is, a pupil division number is two. The pupil division number, however, may be three or more.

Note that the number of pixels in the y direction is divided by the pupil division number and thus is reduced in the configuration according to the present embodiment, unlike the first embodiment. For example, if the pupil division number is two, the number of pixels is halved.

Fourth Embodiment

A fourth embodiment is different from the third embodiment in that two or more dispersive elements P are arranged. In the present embodiment, a detailed description of the same matters as those in the third embodiment will be omitted.

Figure 7:
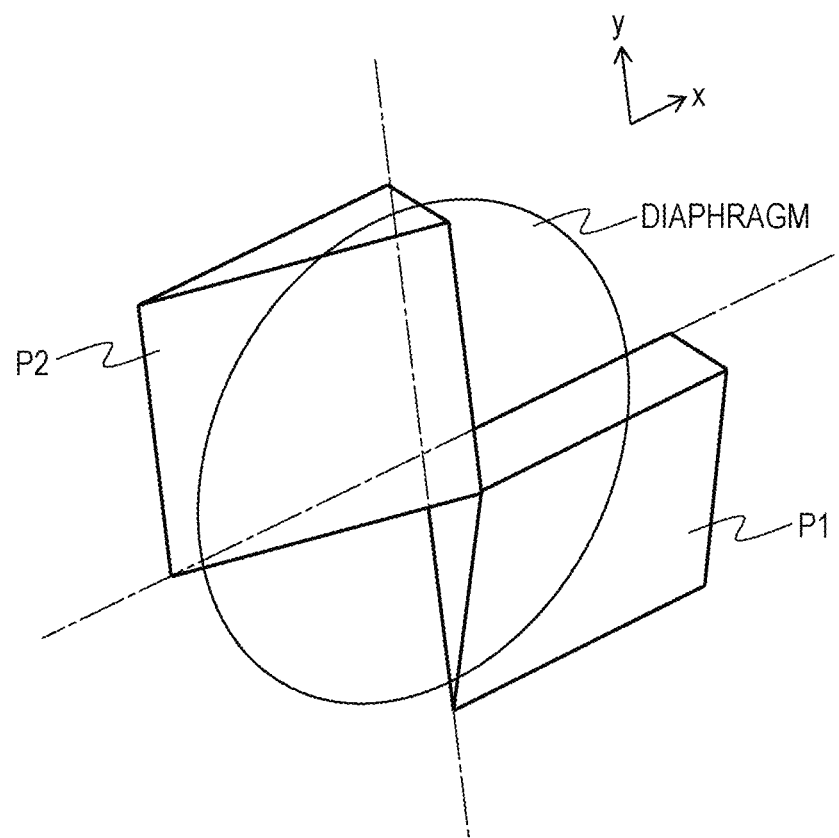
FIG. 7 is a schematic view showing dispersive elements according to a fourth embodiment of the present disclosure.

FIG. 7 is a schematic view showing dispersive elements P1 and P2 according to the present embodiment. FIG. 7 shows four parts of a region in the vicinity of a diaphragm. This region corresponds to a region at a surface on the image pickup device S side of an imaging optical system L2 shown in FIG. 5, for example. The dispersive element P1 is arranged in at least one of the four parts, and the dispersive element P2 is arranged in at least another one. The dispersive element P1 disperses an incident light beam in a y direction in accordance with wavelength, and the dispersive element P2 disperses an incident light beam in an x direction.

Figure 8:
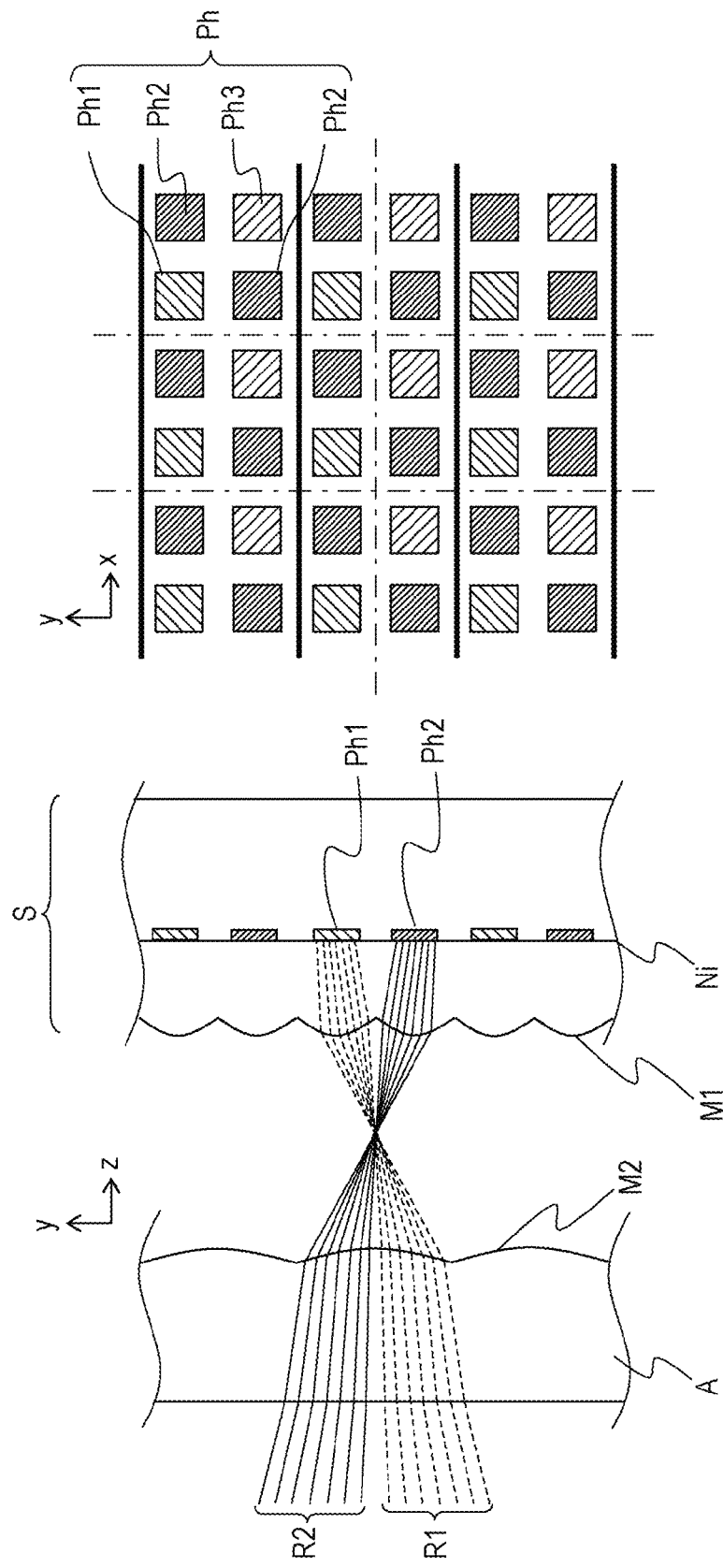
FIG. 8A is a view showing the relation between an optical array element and an image pickup device according to the fourth embodiment of the present disclosure.
FIG. 8B is a view showing the positional relation between the optical array element and pixels on the image pickup device.

FIG. 8A is a cross-sectional view showing the detailed configuration of an optical array element A according to the present embodiment. In the present embodiment, the optical component M2 of the optical array element A is a microlens. The use of a microlens as the optical component M2 allows a light beam incident on each microlens to be separated in four directions.

FIG. 8B is a view showing the pixel configuration of an image pickup device S according to the present embodiment. The image pickup device S has a plurality of pixels Ph1, on which a light beam after passage through the dispersive element P1 is incident, a plurality of pixels Ph3, on which a light beam after passage through the dispersive element P2 is incident, and a plurality of pixels Ph2, on which a light beam without passage through any dispersive element is incident. The image pickup device S acquires three different images through those pixels.

In the present embodiment, use of pieces of spectral data for both the x direction and the y direction for reconstruction allows improvement in reconstruction accuracy. The configuration is particularly effective in the case when the pattern of an object to be measured has no change in one direction (for example, a stripe pattern).

Shift amounts in accordance with the dispersive elements P1 and P2 may be set different from each other. This allows acquisition of two types of image data, image data with a larger number of spectral bands and image data with a smaller number of spectral bands. For example, it is possible to acquire a hyperspectral image with several tens of bands or more from a light beam after passage through the dispersive element P1 and a multi-spectral image with several bands from a light beam after passage through the dispersive element P2. Note that, in this case, shift directions by the dispersive elements P1 and P2 may not be different. The shift directions of both of the dispersive elements P1 and P2 may be the x direction or the y direction.

The present embodiment has illustrated an example in which a pupil division number is four. The present disclosure, however, is not limited to this. For example, the pupil division number may be two, three, or five or more. In the present embodiment as well as the third embodiment, the number of pixels decreases with an increase in the pupil division number.

Experimental Results

Example

An example of the present disclosure will be described.

Figure 9:
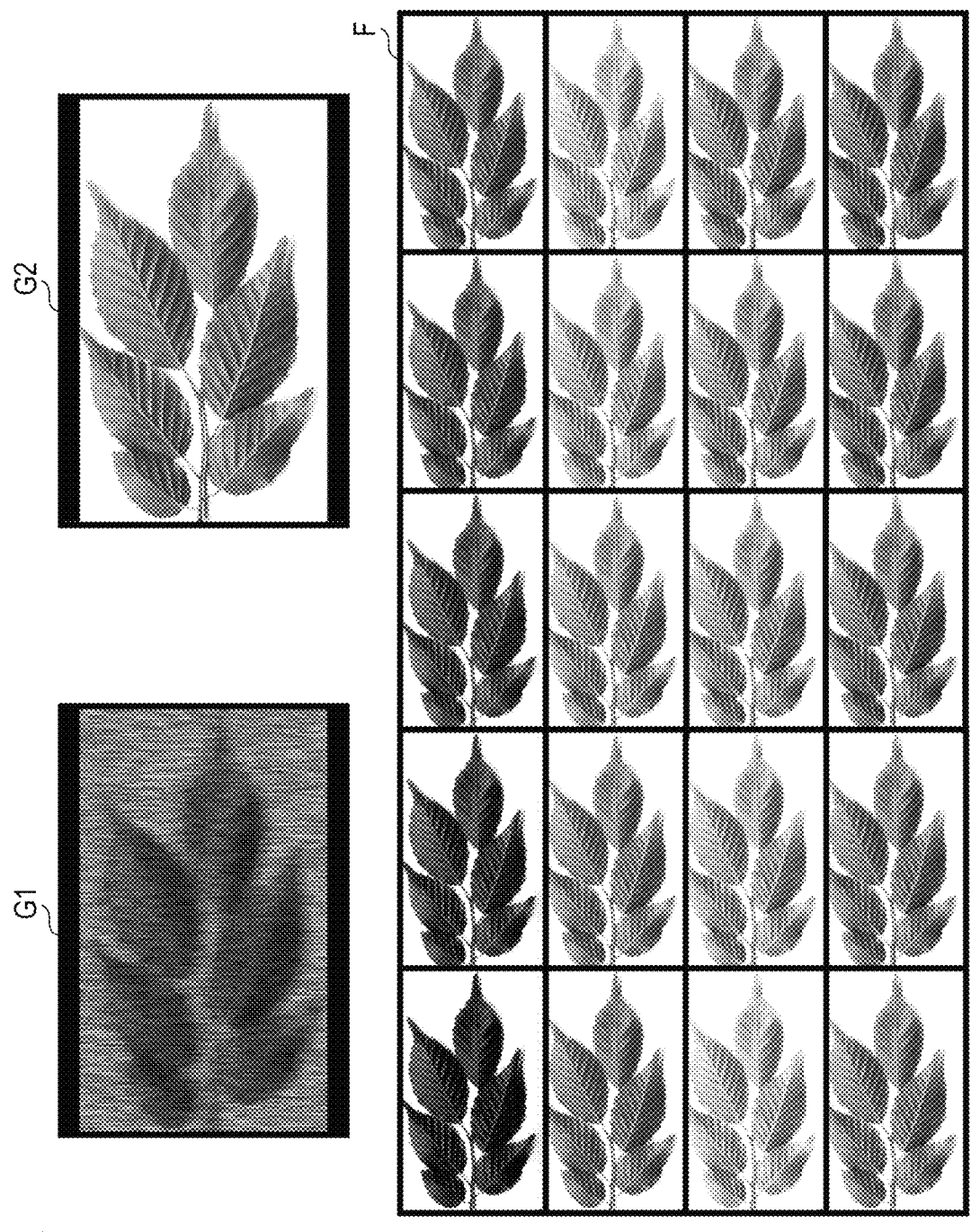
FIG. 9 is a view showing an image generation result according to Example of the present disclosure.

FIG. 9 is a view showing one example of a result of reconstructing spectral images F using a spectroscopic method according to the present disclosure. An element having a binary pattern with a plurality of translucent regions and a plurality of light-blocking regions randomly arrayed, as shown in FIG. 2A, was used as an encoder C. The light transmittance of each translucent region was approximately 100%, and the light transmittance of each light-blocking region was approximately 0%. The number of spectral bands was 20. A dispersive element P was designed so that components in a multiple image were shifted in a y direction per one pixel for each spectral band.

A first image G1 was a 500×292 pixel image which was formed from one of light beams, into which a light beam is split by a beam splitter B. The first image G1 was an image based on a light beam encoded and dispersed in accordance with wavelength. Images for the 20 wavelength bands were shifted in an image longitudinal direction per one pixel for each wavelength band. With the 20 bands, there was a spatial difference of 19 pixels in the longitudinal direction between the image for a shortest wavelength band and the image for a longest wavelength band.

A second image G2 was a 500×292 pixel monochrome image which was formed from the other of the light beams split by the beam splitter B. The second image G2 was an image based on a light beam without encoding or dispersing in accordance with wavelength and included pieces of information for all the wavelength bands.

In Example, the spectral images F for 20 wavelength bands were obtained by finding a solution by an estimation algorithm in Formula (4) using the first image G1 and the second image G2. At the time, total variation (TV) was used as a regularization term.

Comparative Example

As a comparative example, spectral images F were reconstructed using only a first image G1 without use of a monochrome image as the second image G2 in Example.

Figure 10:
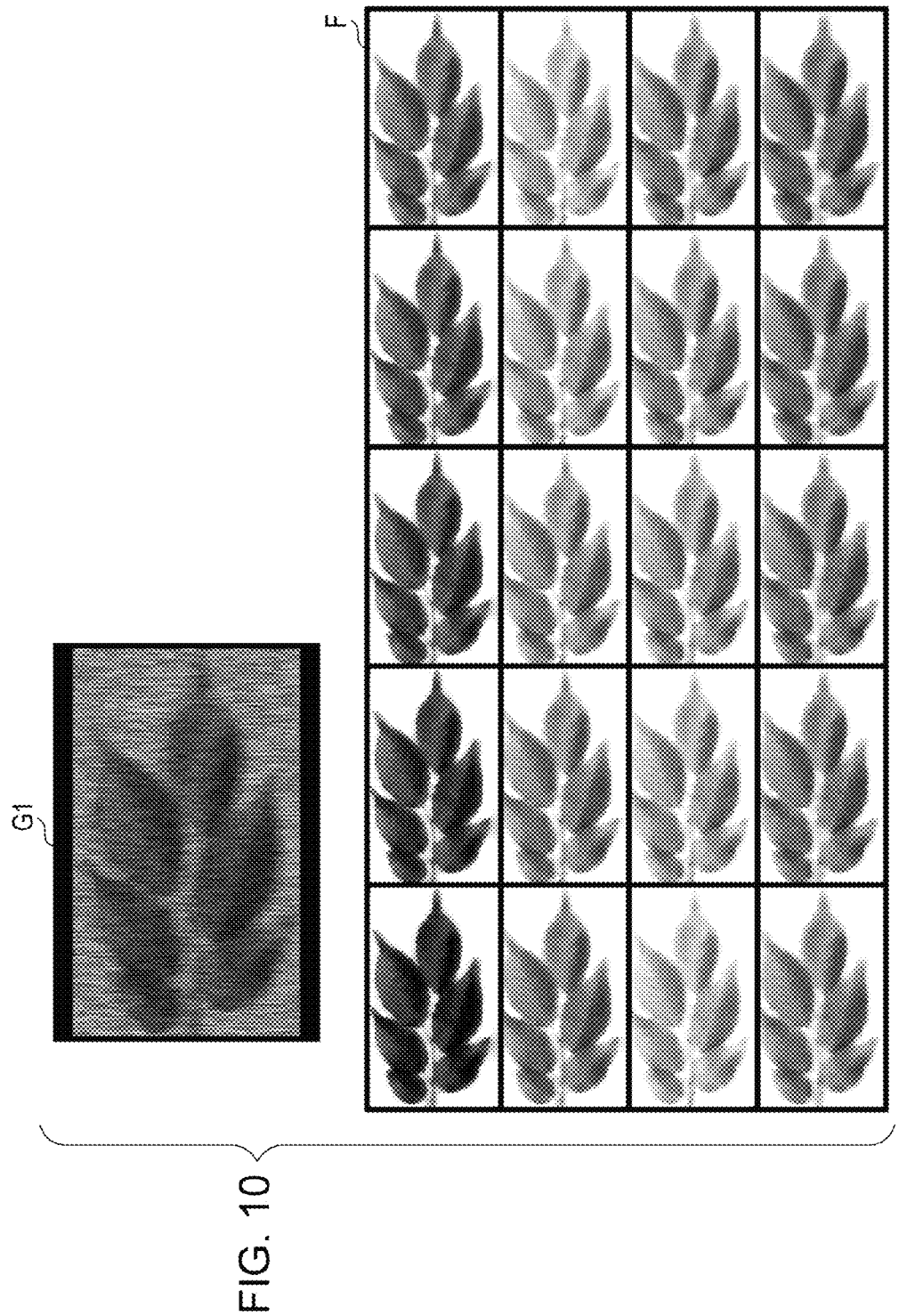
FIG. 10 is a view showing an image generation result according to Comparative Example of the present disclosure.

FIG. 10 is a view showing a result of the comparative example. It can be seen that, although separation among spectral bands is satisfactory, a resolution is lower than the result in FIG. 9.

FIG. 11 shows respective mean squared errors (MSEs) with respect to a correct answer image for Example and Comparative Example. Each MSE is represented by Formula (5) and indicates a mean square error per pixel. A smaller value means greater closeness to a correct answer image.

$$MSE = \frac{1}{n \cdot m} \sum_{i=1}^{n} \sum_{j=1}^{m} (I'_{i,j} - I_{i,j})^2 \qquad (5)$$

In Formula (5), n and m represent the numbers of longitudinal pixels and lateral pixels, respectively, of an image, $I'_{i,j}$ represents a pixel value in an i-th row and a j-th column of a reconstructed image (i.e., spectral image), and $I_{i,j}$ represents a pixel value in an i-th row and a j-th column of a correct answer image. Note that images used in Example and the Comparative Example are 8-bit images, and the maximum value of a pixel value is 255.

The abscissa in FIG. 11 represents the image number of each reconstructed spectral image F, and the ordinate represents the value of an MSE. It can be confirmed from FIG. 11 that, if reconstruction is performed by the method according to Example, the MSE of any spectral image F has a small value and that the spectral image F is close to the correct answer image. The value of the MSE is about 10 to 20, and the spectral image F is found to almost coincide with the correct answer image. In Comparative Example using a conventional method, it can be seen that the values of MSEs are uniformly high and that the spectral images are more severely degraded than the correct answer image. An MSE according to Example is 12 times smaller than an MSE according to Comparative Example at a minimum and is 34 times smaller at a maximum, which shows the efficacy of the method according to the present disclosure.

An image pickup apparatus according to the present disclosure is effective for a camera or a measurement instrument which acquires two-dimensional images with multiple wavelengths. The image pickup apparatus can be applied to sensing for a living body, medical purposes, and cosmetic purposes, a system for inspecting foreign substances and residual pesticides in food, a remote sensing system, an in-car sensing system, and the like.

While the present disclosure has been described with respect to exemplary embodiments thereof, it will be apparent to those skilled in the art that the disclosure may be modified in numerous ways and may assume many embodiments other than those specifically described above. Accordingly, it is intended by the appended claims to cover all modifications of the disclosure that fall within the true spirit and scope of the disclosure.

What is claimed is:

1. An image pickup apparatus comprising:
    an encoder located on an optical path of light from an object, the encoder including a plurality of first regions with first light transmittance and a plurality of second regions with second light transmittance lower than the first light transmittance;
    a dispersive element located farther away from the object than the encoder on the optical path to cause light to be spatially dispersed into a plurality of light components of different wavelengths;
    at least one image pickup device located to
        receive the plurality of light components of different wavelengths to acquire a first image, in which the plurality of light components of different wavelengths are superimposed in mutually shifted positions, and
        receive light from the object without passing through the dispersive element to acquire a second image; and
    a signal processing circuit which generates a plurality of images for respective wavelength bands of the light, based on the first image, the second image, and a spatial distribution of light transmittance in the encoder,
    wherein a spatial resolution of each of the plurality of images for respective wavelength bands of the light generated by the signal processing circuit is higher than a spatial resolution of each of images for respective wavelength bands of the light generated without using the second image.

2. The image pickup apparatus according to claim 1, further comprising:
    a beam splitter located between the object and the dispersive element on the optical path to split light incident thereto into a plurality of split light, wherein
    the dispersive element causes one of the plurality of split light to be spatially dispersed into the plurality of light components of different wavelengths, and
    the at least one image pickup device includes
        a first image pickup device located to receive the plurality of light components of different wavelengths to acquire the first image, and
        a second image pickup device located to receive another of the plurality of split light without passing through the dispersive element to acquire the second image.

3. The image pickup apparatus according to claim 2, wherein the encoder is located between the beam splitter and the dispersive element.

4. The image pickup apparatus according to claim 3, further comprising:
    a first optical system located between the object and the beam splitter on the optical path to focus light onto a face of the encoder; and
    a second optical system located between the encoder and the dispersive element to cause each of the plurality of light components of different wavelengths to be focused onto an image pickup face of the first image pickup device.

5. The image pickup apparatus according to claim 2, wherein
the encoder located between the object and the beam splitter, and
the image pickup apparatus further includes an optical system located between the encoder and the beam splitter to
cause each of the plurality of light components of different wavelengths to be focused onto a first image pickup face of the first image pickup device, and
cause the other of the plurality of split light to be focused onto a second image pickup face of the second image pickup device.

6. The image pickup apparatus according to claim 1, wherein
the dispersive element is located to cause a part of a light beam toward the at least one image pickup device to be spatially dispersed into the plurality of light components of different wavelengths,
the image pickup device includes
a plurality of first light detection cells to receive the plurality of light components of different wavelengths to acquire the first image,
a plurality of second light detection cells to receive another part of the light beam without passing through the dispersive element to acquire the second image, and
an optical array located to face an image pickup face of the image pickup device, the optical array causing the plurality of light components of different wavelengths to enter the plurality of first light detection cells and causing the other part of the light beam without passage through the dispersive element to enter the plurality of second light detection cells.

7. The image pickup apparatus according to claim 1, wherein the signal processing circuit generates the plurality of images for the respective wavelength bands by a statistical method.

8. The image pickup apparatus according to claim 1, wherein the number of pieces of data in the plurality of images for the respective wavelength bands of the light is larger than a sum of the number of pieces of data in the first image and the number of pieces of data in the second image.

9. The image pickup apparatus according to claim 1, wherein
the signal processing circuit generates the plurality of images for the respective wavelength bands by calculating a vector f in accordance with the following formula:

$$f' = \mathop{\mathrm{argmin}}_{f} \|g - Hf\|_{l_2} + \tau \Phi(f)$$

where g is a vector whose elements contain signal values of a plurality of pixels in the first image and signal values of a plurality of pixels in the second image, H is a matrix which is determined by the spatial distribution of light transmittance in the encoder and a spectral characteristic of the dispersive element, $\tau\Phi(f)$ is a regularization term, and i is a weighting factor.

10. A spectroscopic system comprising:
an image pickup apparatus which includes
an encoder located on an optical path of light from an object, the encoder including a plurality of first regions with first light transmittance and a plurality of second regions with second light transmittance lower than the first light transmittance,
a dispersive element located farther away from the object than the encoder on the optical path to cause light to be spatially dispersed into a plurality of light components of different wavelengths, and
at least one image pickup device located to
receive the plurality of light components of different wavelengths to acquire a first image, in which the plurality of light components of different wavelengths are superimposed in mutually shifted positions, and
receive light from the object without passing through the dispersive element to acquire a second image; and
a signal processing apparatus which generates a plurality of images for respective wavelength bands of light, based on the first image, the second image, and a spatial distribution of light transmittance in the encoder,
wherein a spatial resolution of each of the plurality of images for respective wavelength bands of the light generated by the signal processing circuit is higher than a spatial resolution of each of images for respective wavelength bands of the light generated without using the second image.

11. A spectroscopic method comprising:
spatially encoding intensity of light from an object;
spatially dispersing at least part of the encoded light into a plurality of light components of different wavelengths;
acquiring a first image, in which the plurality of light components of different wavelengths are superimposed in mutually shifted positions;
acquiring a second image, based on light from the object without spatially dispersed in accordance with wavelength; and
generating a plurality of images for respective wavelength bands, based on the first image, the second image, and a pattern for the encoding,
wherein a spatial resolution of each of the plurality of images for respective wavelength bands is higher than a spatial resolution of each of images for respective wavelength bands generated without using the second image.

* * * * *